Nov. 8, 1966

R. WALL ETAL 3,284,792

CODE CONVERSION CIRCUIT

Filed Jan. 31, 1962

INVENTORS
RUSSELL WALL
WALTER WOLIN
ART T. ARCAND

BY H. S. Mackey
ATTORNEY

United States Patent Office 3,284,792 Patented Nov. 8, 1966

3,284,792
CODE CONVERSION CIRCUIT
Russell Wall, Long Island City, Walter Wolin, New City, and Art T. Arcand, Yorktown Heights, N.Y., assignors to General Precision, Inc., a corporation of Delaware
Filed Jan. 31, 1962, Ser. No. 170,103
8 Claims. (Cl. 340—347)

This invention relates to code conversion circuits and more particularly to a conversion circuit which is suitable for converting a nonreturn-to-zero electric code to a return-to-zero electric code.

Digital data processing machines and digital computers are for the most part extremely complicated devices employing a multitude of circuits for accomplishing the desired results. While solid state devices, such as transistors and diodes have reduced the possibility of circuit failure to a minimum, these devices are, nevertheless, due to the multitude of circuits employed, subject to a large number of failures.

Very often it is desirable to view on an oscilloscope the waveforms present in various circuits when a test program is inserted into the machine since it is possible, by viewing the waveforms and comparing these with standard waveforms, to determine what is causing difficulty or failure of the machine. If the computer or processor employs a return-to-zero electric code; that is, a code which for 1 employs a pulse having a large amplitude and for a 0 another pulse having a voltage of lesser amplitude with a return-to-zero between each successive pulse, no difficulty arises since each of the pulses is distinct and, therefore, distinguishable when viewed on an oscilloscope screen. However, those computers and data processors which employ the nonreturn-to-zero type of electric code present quite a different problem. Here a voltage level will remain constant if the code calls for successive similar numerals or units. Thus, a binary code having three successive 1's will merely show on the scope as a straight line having a certain length, thus making quick analysis difficult without careful measurement of the length of the trace on the scope.

According to the invention, the nonreturn-to-zero format is changed to a return-to-zero format which clearly distinguishes on an oscilloscope the various bits. In addition, the groups of bits which form individual characters are further distinguished by adding alternately to the characters different fixed voltages so that when viewed on an oscilloscope they are space separated and, thus, readily distinguishable one from the other.

One object of the invention is to provide a novel circuit for converting a nonreturn-to-zero electric code to a return-to-zero electric code.

Another object of the invention is to provide a circuit, as stated above, which will, when used in combination with an oscilloscope for trouble shooting digital data processing machines and digital computers, distinguish successive characters from each other.

Yet another object is to provide a circuit as stated which is inexpensive to manufacture and reliable in operation.

The invention contemplates a circuit for converting a nonreturn-to-zero electric code to a return-to-zero electric code comprising a source of clock signals for supplying a single pulse during each bit time of the nonreturn-to-zero electric code. A coincident circuit means receives the nonreturn-to-zero code and the clock pulses and supplies a pulse output during each clock pulse time that the nonreturn-to-zero signal is at one of its predetermined levels. Amplifying means amplifies the output of the coincident means and a portion of each clock pulse is combined with the amplified output whereby the combined output provides a large amplitude pulse for each nonreturn-to-zero code bit at said predetermined level and a smaller amplitude pulse for each nonreturn-to-zero code bit not at said predetermined level.

The foregoing and other objects and advantages of the invention will become more apparent from a consideration of the detailed description and drawings which follows.

Figure 1:
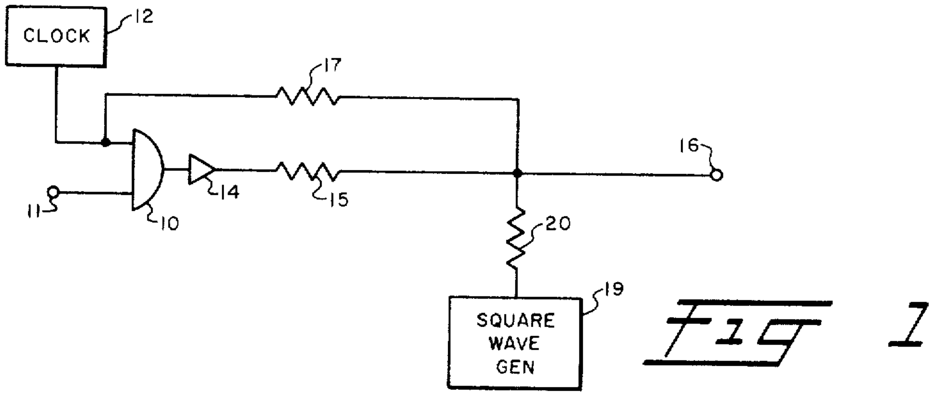
FIGURE 1 is a schematic circuit diagram of the novel conversion circuit.

In FIGURE 1 an "and" gate 10 has one input connected to a terminal 11 which is adapted to receive a nonreturn-to-zero electric code from a computer or data processing device. The other input of "and" gate 10 is connected to a clock 12 which supplies a single clock pulse during each bit time of the code applied to terminal 11. A noninverting amplifier 14 is connected to the output of gate 10 and has its output connected by a resistor 15 to an output terminal 16. The output of clock 12 is connected by a resistor 17 to output terminal 16 and a square-wave generator 19 is connected by resistor 20 to output terminal 16.

The voltage from generator 19 alternates between two predetermined voltages, each of which has a duration equal to the time of one complete character of the code. Thus, if the code employs 7 bits per character, the first voltage from the generator will persist for 7 bit times and the second voltage will persist for 7 bit times, also.

Figure 2:
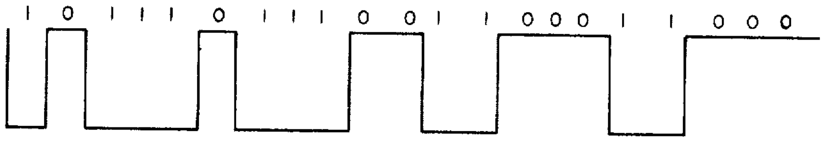
FIGURES 2–5 are graphs showing voltages versus time at certain points in the circuit of FIGURE 1.

The code applied to terminal 11 is shown in FIGURE 2. It should be noted, however, that this may vary depending upon the makeup of the code. Here a 7 bit code is shown; the first character being 1011101, the second character being 1100110 and the third character 0011000.

Figure 4:
Figure 3:
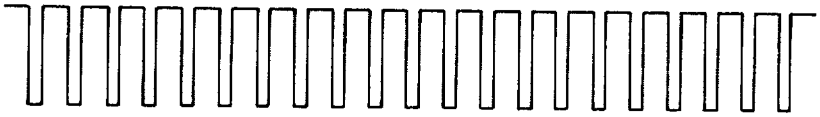

The output of clock 12 is shown in FIGURE 3 and the output of the square-wave generator is shown in FIGURE 4. The three voltage waveforms in FIGURES 2, 3 and 4 are combined by the circuit and appear at terminal 16 in the form shown in FIGURE 5.

Figure 5:
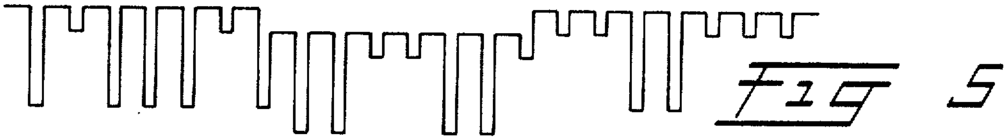

The 1's level of the first bit shown in FIGURE 2 and the clock pulse provide the first pulse of FIGURE 5 directly through amplifier 14. This is augmented by a portion of the clock pulse which is sent through resistor 17 to the output terminal 16. During the second bit of the first character "and" gate 10 provides no output. However, a small amplitude pulse is provided at output terminal 16 since a portion of a clock pulse voltage appears at terminal 16 via resistor 17. Therefore, a 1 will appear as a large amplitude output pulse and a 0 as a smaller amplitude pulse with a return to zero between successive pulses. The voltage from square-wave generator 19 is added to the voltage appearing at terminal 16 and will displace the voltage level of the first group of bits constituting the first character from the next and so forth throughout the duration of the code. If output terminal 16 is connected to the input of a cathode ray oscilloscope, the output will appear as shown in FIGURE 5. It can be seen from this graph that a bit-by-bit examination of each character can be made readily to determine wherein a fault may lie. This display instantaneously provides all of the information that a technician servicing the equipment might require. While the output waveform shown in FIGURE 2 contains the identical information, it is, however, extremely difficult to read and, therefore, increases the possibility of error.

While only one embodiment of this invention has been shown and described in detail for illustration purposes, it is to be expressly understood that the invention is not to be limited to the specific embodiment shown.

What is claimed is:

1. A circuit for converting a nonreturn-to-zero electric code to a return-to-zero electric code comprising, a source of clock signals for supplying a single pulse during each bit time, coincident means for receiving the nonreturn-to-zero code and the clock pulses and for supplying a pulse output during each clock pulse time that the nonreturn-to-zero signals is at a 1 level, and means for summing a portion of each clock pulse with the output from said coincident means whereby said summed output provides a large amplitude pulse for each one bit in said nonreturn-to-zero code and smaller amplitude pulse for each zero bit in said code.

2. A circuit for converting a nonreturn-to-zero electric code to a return-to-zero electric code comprising, a source of clock signals for supplying a single pulse during each bit time, coincident means for receiving the nonreturn-to-zero code and the clock pulses and for supplying a pulse output during each clock pulse time that the nonreturn-to-zero signals is at a 1 level, amplifying means for amplifying the output of said coincident means, and means for summing a portion of each clock pulse with the amplifier output whereby said summed output provides a large amplitude pulse for each one bit in said nonreturn-to-zero code and smaller amplitude pulse for each zero bit in said code.

3. A circuit for converting a nonreturn-to-zero electric code to a return-to-zero electric code and for distinguishing between successive groups of predetermined bits comprising, a source of clock signals for supplying a single pulse during each bit time of the coded electric signal, coincident means for receiving the nonreturn-to-zero code and the clock pulses and for supplying a pulse output coincident with said clock pulses whenever the code is at a 1 level, means for alternately providing two different voltages each of which has a duration equal to a predetermined number of bits of said code, and means for summing the said two different voltages with the output from said coincident means and a portion of each clock pulse whereby the summed output provides a large amplitude pulse for each 1 bit in the code and smaller amplitude pulse for each 0 in the code and adjacent predetermined numbers of pulses constituting groups of pulses are voltage displaced from each other.

4. A circuit for converting a nonreturn-to-zero electric code to a return-to-zero electric code and for distinguishing between successive groups of predetermined bits comprising, a source of clock signals for supplying a single pulse during each bit time of the coded electric signal, coincident means for receiving the nonreturn-to-zero code and the clock pulses and for supplying a pulse output coincident with said clock pulses whenever the code is at a 1 level, an amplifier for amplifying the output from said coincident means, means for alternately providing two different voltages each of which has a duration equal to a predetermined number of bits of said code, and means for summing the said two different voltages with the amplifier output and a portion of each clock pulse whereby the summed output provides a large amplitude pulse for each 1 bit in the code and smaller amplitude pulse for each 0 in the code and adjacent predetermined numbers of pulses constituting groups of pulses are voltage displaced from each other.

5. A circuit for converting a nonreturn-to-zero electric code to a return-to-zero electric code comprising; a source of clock signals for supplying a single pulse during each bit time of the code; an and gate for receiving the nonreturn-to-zero code and the clock pulses and for supplying a pulse output during each clock pulse time that the nonreturn-to-zero code is at a 1 level; a resistive network having a first resistor for connecting said clock pulse source to an output terminal, a second resistor for connecting the and gate output to the output terminal, and a third resistor for connecting said output terminal to a reference voltage level whereby a large amplitude pulse is supplied at said output terminal for each 1 bit in said nonreturn-to-zero code and a smaller amplitude pulse for each 0 bit in said code.

6. A converting circuit as defined in claim 5 in which said reference voltage level is alternately changed from a first voltage to second voltage at a predetermined frequency to voltage displaced predetermined numbers of consecutive bits from each other.

7. A circuit for converting a nonreturn-to-zero electric code to a return-to-zero electric code comprising; a source of clock signals for supplying a single pulse during each bit time of the code; an and gate for receiving the nonreturn-to-zero code and the clock pulses and for supplying a pulse output during each clock pulse time that the nonreturn-to-zero code is at a 1 level; amplifying means for amplifying the output of said and gate; a resistive network having a first resistor for connecting said clock pulse source to an output terminal, a second resistor for connecting the amplified output to the output terminal, and a third resistor for connecting said output terminal to a reference voltage level whereby a large amplitude pulse is supplied to said output terminal for each 1 bit in said nonreturn-to-zero code and a smaller amplitude pulse for each 0 bit in said code.

8. A converting circuit as defined in claim 7 in which said reference voltage level is alternately changed from a first voltage to a second voltage at a predetermined frequency to voltage displaced predetermined numbers of consecutive bits from each other.

References Cited by the Examiner

UNITED STATES PATENTS 2,659,049 11/1953 Grieg et al. ---------- 340—347

OTHER REFERENCES

Phister: Logical Design of Digital Computers, 1958, John Wiley & Sons, QA 76.5 p4c.2, pp. 23–24; pp. 112–115; p. 39; relied on.

Scott: Analog and Digital Computer Technology, 1960, McGraw-Hill, QA 76 538C.2, pp. 498–500 relied on.

MAYNARD R. WILBUR, *Primary Examiner.*

MALCOLM A. MORRISON, *Examiner.*

D. M. ROSEN, L. W. MASSEY, A. L. NEWMAN, *Assistant Examiners.*